United States Patent [19]

Kawamoto

[11] Patent Number: 4,669,326
[45] Date of Patent: Jun. 2, 1987

[54] TRANSMISSION FOR AN AUTOMOBILE

[76] Inventor: Tamio Kawamoto, 1218-6, Fuchinobe, Sagamihara City, Japan

[21] Appl. No.: 116,640

[22] Filed: Jan. 29, 1980

[30] Foreign Application Priority Data

Jan. 30, 1979 [JP] Japan ................................. 54-9862
Jan. 30, 1979 [JP] Japan ................................. 54-9864

[51] Int. Cl.⁴ ............................................. F16H 3/08
[52] U.S. Cl. ....................................... 74/363; 74/325
[58] Field of Search ................. 74/325, 331, 333, 357, 74/359, 360, 363

[56] References Cited

U.S. PATENT DOCUMENTS

| | | | |
|---|---|---|---|
| 2,193,733 | 3/1940 | Maier | 74/359 X |
| 2,602,346 | 7/1952 | Eaton et al. | 74/359 X |
| 3,046,807 | 7/1962 | Barth et al. | 74/359 X |
| 3,115,047 | 12/1963 | Lunn et al. | 74/359 X |
| 3,115,048 | 12/1963 | Cape | 74/333 X |
| 3,173,303 | 3/1965 | Galaniuk | 74/359 X |
| 3,202,005 | 8/1965 | Ivanchich | 74/359 X |
| 3,916,712 | 11/1975 | Kelbel et al. | 74/325 X |
| 4,033,197 | 7/1977 | Shikiya et al. | 74/359 X |
| 4,094,206 | 6/1978 | Sogo et al. | 74/325 X |
| 4,228,693 | 10/1980 | Kelbel | 74/359 X |

FOREIGN PATENT DOCUMENTS

| | | |
|---|---|---|
| 473568 | 3/1975 | Australia . |
| 138916 | 11/1979 | Fed. Rep. of Germany . |
| 845289 | 11/1956 | United Kingdom . |
| 1045972 | 4/1963 | United Kingdom . |
| 1121632 | 1/1966 | United Kingdom . |
| 1501674 | 2/1978 | United Kingdom . |

Primary Examiner—Leslie A. Braun
Assistant Examiner—Dirk Wright

[57] ABSTRACT

A transmission for an automobile including a main shaft driven by and concentric to a main drive shaft driven by an engine and a counter shaft arranged in parallel with the main shaft according to the invention comprises change gears mounted on the main shaft between two bearings journaling the main shaft in the order of higher and lower speed gears and an overdrive gear. Diameters of journals of the main shaft for these gears are stepwise enlarged in the order of the journals for the higher and lower speed gears. The overdrive gear is integrally formed on the main shaft on a side of an end of the journal for the lowest speed gear remote from the higher speed gear. The transmission is easy in assembling and manufacturing and rigid and compact in construction.

2 Claims, 6 Drawing Figures

TRANSMISSION FOR AN AUTOMOBILE

BACKGROUND OF THE INVENTION

1. Field of the Invention

The present invention relates to an improvement in a transmission, particularly a five-speed transmission for an automobile.

2. Description of the Prior Art

With most of the manual transmissions for automobiles hitherto used, on a main shaft serving as an output shaft journaled in a gear housing are loosely mounted various speed-change gears among which one gear corresponding to a required vehicle speed is selected and fixed to the main shaft by a synchromesh device or the like. With a transmission including overdrive gearing, however, it has recently been suggested to loosely mount one overdrive gear on the counter shaft and fix the other overdrive gear onto the main shaft for the purpose of decreasing the moment of inertia of the overdrive gears and obtaining higher vehicle speeds by reducing the diameter of the overdrive gear.

As shown in FIG. 1, with such a transmission, which is shown as a five-speed version for a passenger car, a main shaft 5 is journaled in bearings 9, 11 and 14b. Bearing 9 is located in a front wall of a transmission casing 1, bearing 11 is located in an adaptor plate 1b provided between the transmission casing 1 and rear extension 3 and bearing 14b is located in a stiffener plate 14a of the rear extension 3. First to fourth gears 17, 16 15 and 13 are mounted on the main shaft 5 between the bearings 9 and 11, and a reverse gear 28 and an overdrive gear 20 are arranged between the bearings 11 and 14b.

In this case, the main shaft 5 between the bearings 9 and 11 has a maximum diameter at its mid portion where it is subjected to maximum loads and stepwise progressively reduced diameters towards ends in consideration of the rigidity of the shaft. Therefore, the diameter of the main shaft where the heavier first gear 17 is mounted is small, so that the first gear is arranged adjacent to the bearing 11 as near as possible to reduce a moment arm, thereby avoiding an excess stress acting upon the main shaft.

In a transmission for a truck or the like it is possible to form an overdrive gear integrally with a main shaft by increasing its diameter because of no limitation of a space for the shaft. In a transmission for a passenger car, however, such an increase in diameter of a main shaft has a limitation in space and makes it difficult to pass the main shaft through a transmission casing and to arrange various gears for assembling the transmission and actually impossible unless an entire dimension is changed.

It may be possible to reduce the size of the overdrive gear by reducing the number of its teeth. However, the number of teeth of a gear has a minimum limitation under a determined module. Accordingly, the gear ratio is limited under a determined length of the main shaft and the limited gear ratio obstructs the improvement of the performance of the transmission. In this case, the overdrive gear has been usually formed as a ring gear which is removably fixed onto the main shaft by means of spline grooves and stoppers which would require extra cutting processes and an increase in the number of parts.

In such hitherto used five-speed transmissions, on the other hand, as the main shaft is journaled by the three bearings, the alignment of these bearings with a high degree of accuracy is difficult and the elongated main shaft makes it difficult to render the transmission compact.

To avoid this, it has been suggested to arrange the reverse gear 28 and the overdrive gear 20 within the transmission casing 1 and to support the main shaft in only two bearings 9 and 11. With this arrangement, however, the span between the bearings is elongated, and the heavy first gear 17 is located on the relatively small diameter portion of the main shaft intermediate the bearings 9 and 11. This seriously compromises the rigidity of the main shaft.

Moreover, as shown in FIG. 2 the main shaft is formed at substantially its mid portion with a large diameter flange 50 to axially locate the gears and synchromesh devices, and is formed with journals 36, 37, 39, 40 and 38 whose diameters reduce toward the ends in a stepwise manner.

In cutting and grinding the main shaft, therefore, machining must be effected using the flange as a reference line, which makes machining difficult because longitudinal cutting or grinding in a single operation is impossible. During subsequent assembly, the change gears and synchromesh devices must be mounted on the main shaft from its ends, so that the main shaft cannot be incorporated in the transmission until all mountings of the gears and synchromesh devices have been completed. In addition, as the second and third gears 16 and 15 having intermediate outer diameters are unavoidably mounted on enlarged diameter portions 37 and 36 of the main shaft, radial thicknesses of these gears are decreased, thus also comprising the strength of the gears. This holds true in the synchromesh device and particularly the synchronizing hub.

SUMMARY OF THE INVENTION

It is an object of the invention to provide an improved transmission for an automobile which eliminates all the disadvantages of the prior art above described.

It is another object of the invention to provide a transmission for an automobile which is easy to assemble and manufacture and which is compact in construction, by integrally forming an overdrive gear with a main shaft onto which are arranged speed-change gears in the order of high, low and overdrive gears and having the diameter of their journals stepwise enlarged in the same order.

The invention will be more fully understood by referring to the following detailed specification and claims taken in connection with the appended drawings.

DETAILED DESCRIPTION OF THE PREFERRED EMBODIMENT

Figure 3:
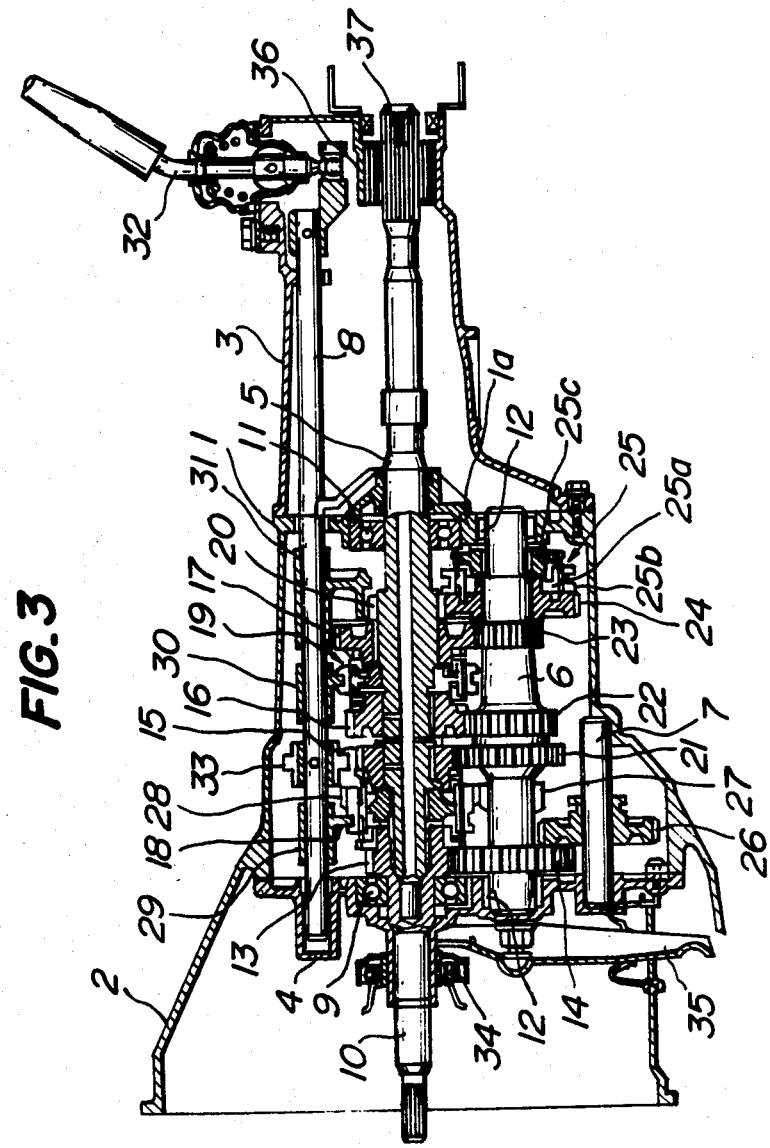
FIG. 3 is a crosssectional view of a transmission of one embodiment of the invention.

Referring to FIG. 3 illustrating a crosssection of a transmission for an automobile to which is applied the present invention, the transmission comprises a transmission casing 1 integrally formed with a clutch housing 2, an extension 3 formed separately from the transmission casing 1 and bolted to the rear end thereof and a front cover 4 secured to a front surface of the transmission casing 1. The transmission casing 1, extension 3 and front cover 4 form a gear housing within which a main shaft 5, a counter shaft 6, an idle shaft 7 and a fork rod 8 are longitudinally journaled in parallel with each other.

The main shaft 5 has a front end rotatably journaled in a hollow rear end of a main drive shaft 10 supported in a bearing 9 fitted in the front cover 4, a substantially mid portion supported in a bearing 11 in a rear end wall of the transmission casing 1 and a rear end extending to the rear end of the extension 3. The counter shaft 6 has front and rear ends journaled in bearings 12 in the front cover 4 and the rear end wall 1a of the transmission casing 1, respectively. The idle shaft 7 is fixed at its ends to the front cover 4 and a part of the transmission casing. The fork rod 8 extends over the lengths of the transmission casing 1 and extension 3 and rotatively and axially movable within determined ranges.

The main drive shaft 10 is rotatively driven through a clutch (not shown) by an engine. The torque of the main drive shaft 10 is transmitted to the counter shaft 6 through a main drive gear 13 provided at the rear end of the main drive shaft and a counter gear 14 in mesh with the main drive gear 13. On the main shaft 5 are provided a third or top gear 15, a second gear 16 and a first or low gear 17 loosely fitted thereon in the order of the left to the right as viewed in FIG. 1. Synchromesh devices 18 and 19 are interposed between the main drive and third gears 13 and 15 and between the second and first gears 16 and 17, respectively. Moreover, an overdrive gear (a fifth gear) 20 is fixedly mounted on the main shaft 5 rearwardly adjacent to the first gear 17.

On the other hand, the counter shaft 6 is integrally formed with a third gear 21, a second gear 22 and a first gear 23 in mesh with the gears 15, 16 and 17, respectively. On the counter shaft on the rear side of the first gear 23 is loosely fitted an overdrive gear 24 in mesh with the overdrive gear 20 and adjacent to the overdrive gear 24 is provided a synchromesh device 25. the synchromesh device 25 comprises a synchronizing hub 25a connected to the overdrive gear 24 by means of a spline grooves, a coupling sleeve 25b rotatable relatively to the shaft 6 and a clutch gear 25c connected to the shaft 6 by means of spline grooves so as to be rotatable therewith.

Figure 1:
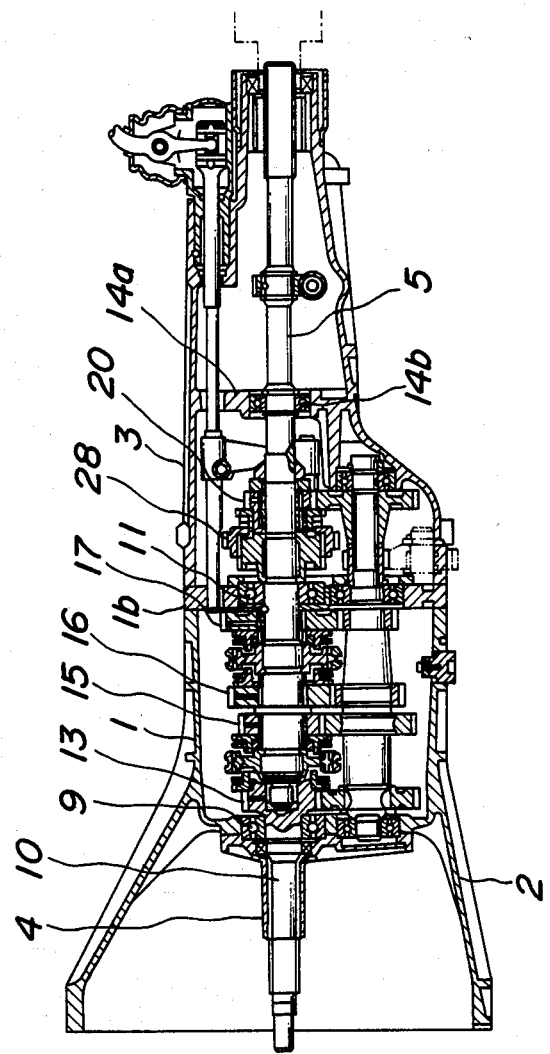
FIG. 1 is a sectional view of a prior art automobile transmission.
Figure 2:
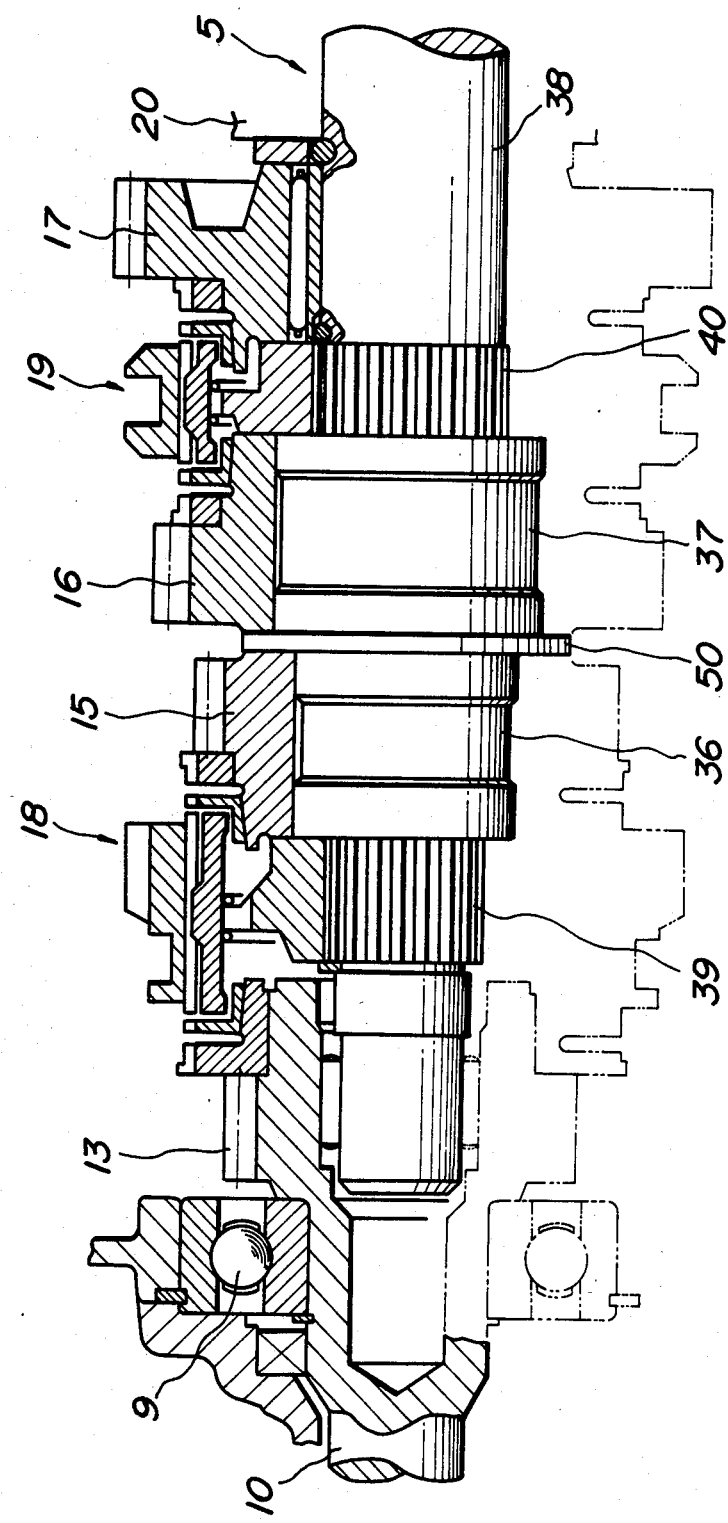
FIG. 2 is an elevation, partly in section, of a principal part of the main shaft and gears carried thereon in the transmission in FIG. 1.

A reverse idle gear 26 is loosely mounted on and axially movable to the idle shaft 7 such that when the idle gear 26 has been shifted from the position shown in FIG. 1 to the right it is engaged with a reverse gear 27 integrally formed with the counter shaft 6 and a reverse gear 28 formed in an outer periphery of a coupling sleeve 18a of the synchromesh device 18, simultaneously.

On the fork rod 8 are loosely fitted forks 29, 30 and 31 with their bosses whose ends are adjacent to each other and corresponding to the synchromesh devices 18, 19 and 25. When the fork rod 8 is rotated about its axis by means of a control lever 32, a shifter 33 integral with the fork rod 8 selects any one of the forks, which is then axially shifted by an axial movement of the fork rod 8. To the transmission casing 1 is pivoted a lever (not shown) having one end abutting against the reverse idle gear 26 and the other end arranged beside the forks so that in reverse the lever is rocked by the shifter 33 to move the reverse idle gear 26 axially. In the drawing a reference numeral 34 illustrates a release bearing and 35 shows a withdrawal lever.

Figure 4:
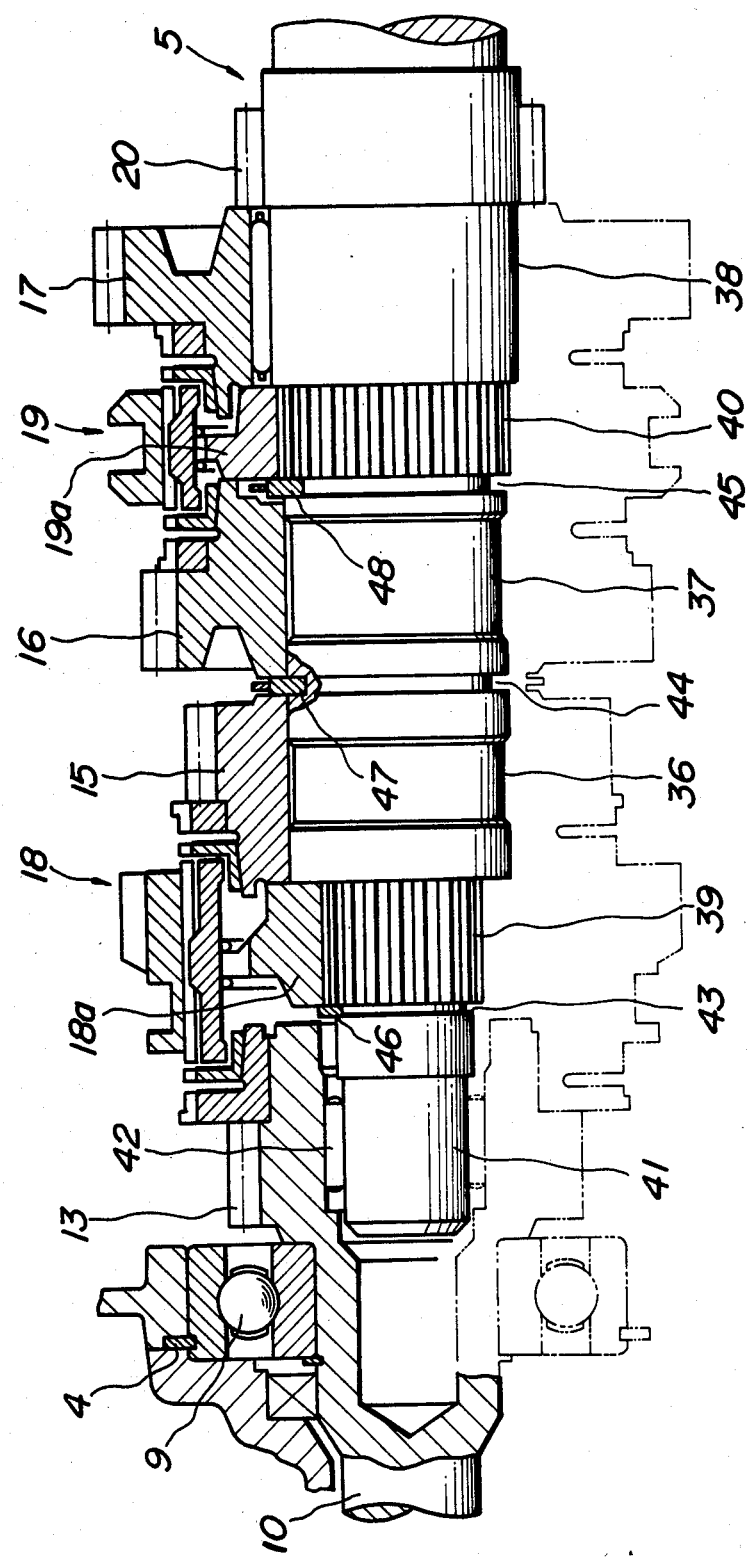
FIG. 4 is an elevation, partly in section of a principal part of a main shaft and gears thereon used in the transmission shown in FIG. 3.

As viewed from left to right in FIG. 4 the main shaft 5 is formed with journals 36, 37 and 38 for the third, second and first gears and (splined) journals 39 and 40 for synchronizing hubs 18a and 19a of the synchromesh devices 18 and 19. The front end of the main shaft 5 adjacent to the journal 39 includes a journal 41 associated with the main drive shaft 10 and rotatably supported by means of a needle bearing 42. Moreover, the shaft 5 is integrally formed on the rear side of the journal 38 for the first gear 17 with the overdrive gear 20.

As can be seen in FIG. 4, the outer diameter of the journal 39 (splines) for the synchronizing hub 18a located at the frontmost position on the main shaft 5 is smaller than those of the journals 36 and 37 for the third and second gears which are in turn less than that of the journal 40 for the synchronizing hub 19a at the rear end of the main shaft 5 which is less than that of the journal 38 for the first gear. In other words, the outer diameters of the journals of the main shaft 5 for the gears and synchronizing hubs are stepwise increased in the order of the journals from the front to rear ends of the main shaft.

With this arrangement, shoulders are formed between journals 39 and 36; 37 and 40; and 40 and 38, which serve to position the synchronizing hub 18a, second gear 16 and synchronizing hub 19a. Annular grooves 43, 44 and 45 are formed respectively at the front end of the journal 39, between the journals 36 and 37 and between the journals 37 and 40 for fitting therein snap rings 46, 47 and 48 as stoppers which in conjunction with the aforesaid shoulders serve to locate all the gears and synchromesh devices in their proper axial positions.

With the main shaft 5 constructed as above described according to the invention, in mounting the gears and synchromesh devices on it, its front end (left end as viewed in FIG. 4) is inserted in the center aperture of the first gear 17 until it is mounted on the journal 38 and further inserted in center apertures of the synchromesh device 19, second gear 16, third gear 15 and synchromesh device 18 in this order until these are mounted on their respective journals. During this mounting operation the snap rings 48, 47 and 46 are of course fitted in their respective grooves.

When in overdrive, the rotating movement of the main drive shaft 10 is transmitted through the main drive gear 13, counter gear 14 (counter shaft 6), clutch gear 25c, coupling sleeve 25b (synchronizing hub 25a) and overdrive gear 24 to the overdrive gear 20 (main shaft 5). The overdrive gear 24 is rotatably mounted on the counter shaft 6, so that the moment of inertia of the overdrive gear 24 becomes small to obtain a smooth gear changing for a speed-change.

Figure 5:
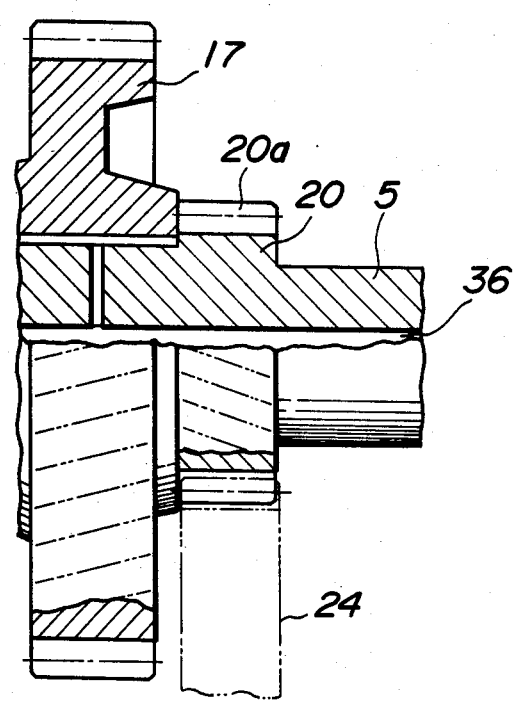
FIG. 5 is an enlarged sectional view of an important part of the main shaft shown in FIG. 4.
Figure 6:
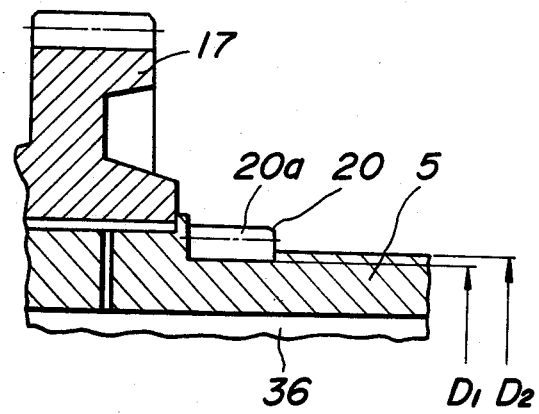
FIG. 6 is an enlarged sectional view of the important part of a main shaft of another embodiment of the invention.

According to the invention as shown in FIG. 5, the main shaft 5 is integrally formed with the overdrive gear 20. In manufacturing the main shaft 5, the portion corresponding to the overdrive gear is formed in a larger diameter over a determined length and the larger diameter portion is then formed in its outer periphery with gear teeth. In the embodiment shown in FIG. 6, a diameter $D_1$ of a bottom circle of the overdrive gear 20 is made smaller than the outer diameter $D_2$ of the main shaft 5. Such a dimensional advantage cannot be obtained in case of a ring gear fitted on a shaft as in the prior art. The decrease of the diameter of the overdrive gear makes it possible to reduce the number of the teeth of the gear with ease, so that even if the mating overdrive gear 24 is not large, a high gear ratio for a higher speed can be obtained. In cutting and grinding the main shaft, its construction above described facilitates a series of operations using jigs moved along the main shaft.

In addition, although the main shaft is integrally formed with the overdrive gear according to the invention, the arranging the main shaft in the transmission and mounting the gears thereon are not obstructed because of the increased diameters of the journals of the main shaft toward its rear end and the gears adapted to be applied to the main shaft from its front end. Such construction of the main shaft makes easy the working of the overdrive gear and increases its rigidity and makes it possible to mount the gears on the main shaft journaled with its rear end thereby facilitating the mounting them very much. All that is required to incorporate the main shaft in a transmission is to insert the main shaft already equipped with the gears into the transmission casing 1 at the front opening (which is later covered by the front cover 4). Accordingly, even if the main shaft includes an enlarged diameter portion for the overdrive gear integrally formed therewith, it does not obstruct the assembly of the main shaft because an insertion of the enlarged diameter portion into a bearing is not needed. In this embodiment, the span between the two bearings where the overdrive gear is formed is somewhat long. It is, however, not disadvantageous because the integral overdrive gear increases the rigidity of the shaft.

With the construction of the main shaft, moreover, the diameters of the journals 38, 37 and 36 are substantially proportional in dimension to the first, second and third gears 17, 16 and 15, respectively, to make substantially uniform the radial thicknesses of these gears, thereby increasing the rigidities of the gears and as the diameter of the journal 38 for the first gear 17 is the largest, the diameter in the proximity of the mid portion of the main shaft becomes large which is advantageous for its rigidity.

As can be seen from the above description, according to the invention the change gears of the transmission are arranged in the order of higher to lower speed gears and overdrive gears whose journals are stepwise increased in diameter in the same order and the main shaft is integrally formed in the end on the largest diameter side with the overdrive gear, thereby increasing the rigidities of the gears and main shaft and decreasing the number of parts, facilitating the manufacturing of the main shaft and overdrive gear and mounting of the gears and synchromesh devices on the main shaft and further enabling the overdrive gear to be small to accomplish a light weight and compact transmission.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In a transmission for an automobile having a main shaft aligned axially with and arranged to be driven by a main drive shaft which is in turn arranged to be driven by an automobile engine, and a counter shaft arranged in parallel with said main shaft, the improvement comprising: said main shaft having one end rotatably journalled in a hollow end of said main drive shaft, the said hollow end in turn being rotatably supported by a first bearing, said main shaft being additionally rotatably journalled in a second bearing spaced axially from said first bearing, a plurality of speed change gears rotatably mounted on said main shaft between said bearings, said speed change gears when viewed from said first bearing towards said second bearing being arranged in a progressively descending order on progressively increased diameter portions of said main shaft, the lowest of said speed change gears being axially located on said main shaft against an overdrive gear integrally fabricated as part of a maximum diameter portion of said main shaft, and said overdrive gear being axially spaced from said second bearing.

2. A transmission as set forth in claim 1, wherein the transmission includes speed change gears at least for five forward and one reverse speeds.

* * * * *